United States Patent
Chang et al.

(10) Patent No.: US 8,440,354 B2
(45) Date of Patent: *May 14, 2013

(54) CATHODE ACTIVE MATERIAL FOR LITHIUM SECONDARY BATTERY

(75) Inventors: Sung kyun Chang, Daejeon (KR); Hong-Kyu Park, Daejeon (KR); Sinyoung Park, Daejeon (KR); Hyo-shik Kil, Daejeon (KR); Hera Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 52 days.

This patent is subject to a terminal disclaimer.

(21) Appl. No.: 13/035,326

(22) Filed: Feb. 25, 2011

(65) Prior Publication Data

US 2011/0315917 A1    Dec. 29, 2011

Related U.S. Application Data

(63) Continuation of application No. PCT/KR2010/003883, filed on Jun. 16, 2010.

(30) Foreign Application Priority Data

Jun. 17, 2009  (KR) .................... 10-2009-0054106

(51) Int. Cl.
*H01M 4/505* (2010.01)
*H01M 4/525* (2010.01)

(52) U.S. Cl.
USPC .......... 429/231.95; 429/231.1; 429/223; 429/224; 423/593.1; 423/954.4; 252/182.1

(58) Field of Classification Search ............ 429/231.95, 429/231.1, 223, 224; 423/593.1, 594.4; 252/182.1
See application file for complete search history.

(56) References Cited

U.S. PATENT DOCUMENTS 6,964,828 B2   11/2005  Lu et al.
7,078,128 B2    7/2006  Lu et al.
7,135,252 B2   11/2006  Thackeray et al.
7,314,682 B2    1/2008  Thackeray et al.
7,935,444 B2 *  5/2011  Chang et al. ............. 429/231.95

FOREIGN PATENT DOCUMENTS

| JP | 2001-83610 A | 3/2001 |
| KR | 10-2003-0034018 B1 | 5/2003 |
| KR | 10-2003-0083476 A | 10/2003 |
| KR | 10-2005-0047291 A | 5/2005 |
| KR | 10-2007-0109854 A | 11/2007 |
| WO | WO2010030131 | * 3/2010 |

OTHER PUBLICATIONS

Influence of Mn content on the morphology and electrochemical performance of LiNi1-x-yCoxMnyO2 cathode materials, J. Mater. Chem., 2003, 13, 1962-1968, Hwang et al.*

Liu et al, "A mixture of LiNi1/3Co1/3Mn1/3O2 and LiCoO2 as postive active material of LIB for power application," Journal of Power Sources, 2007, vol. 174, No. 2, pp. 1126-1130 (Abstract Only).

* cited by examiner

*Primary Examiner* — Mark Kopec
*Assistant Examiner* — Haidung Nguyen
(74) *Attorney, Agent, or Firm* — Birch, Stewart, Kolasch & Birch, LLP

(57) ABSTRACT

Provided is a lithium transition metal oxide having an α-NaFeO$_2$ layered crystal structure, as a cathode active material for lithium secondary battery, wherein the transition metal includes a blend of Ni and Mn, an average oxidation number of the transition metals except lithium is +3 or higher, and the lithium transition metal oxide satisfies Equations 1 and 2 below:

$$1.0 < m(Ni)/m(Mn) \tag{1}$$

$$m(Ni^{2+})/m(Mn^{4+}) < 1 \tag{2}$$

wherein $m(Ni)/m(Mn)$ represents a molar ratio of nickel to manganese and $m(Ni^{2+})/m(Mn^{4+})$ represents a molar ratio of $Ni^{2+}$ to $Mn^{4+}$.

The cathode active material of the present invention has a uniform and stable layered structure through control of oxidation number of transition metals to a level higher than +3, in contrast to conventional cathode active materials, thus advantageously exerting improved overall electrochemical properties including electric capacity, in particular, superior high-rate charge/discharge characteristics.

10 Claims, No Drawings

CATHODE ACTIVE MATERIAL FOR LITHIUM SECONDARY BATTERY

This application is a continuation of PCT/KR2010/003883 filed on Jun. 16, 2010, which claims priority to Korean Application No. 10-2009-0054106 filed on Jun. 17, 2009. The entire contents of the above applications are hereby incorporated by reference into the present application.

TECHNICAL FIELD

The present invention relates to a cathode active material for lithium secondary batteries. More specifically, the present invention relates to a cathode active material which is a lithium transition metal oxide having an α-NaFeO$_2$ layered crystal structure, wherein the transition metal includes a blend of Ni and Mn, an average oxidation number of the transition metals except lithium is higher than +3, and a molar ratio of nickel to manganese (m(Ni)/m(Mn)) and a molar ratio of Ni$^{2+}$ to Mn$^{4+}$ (m(Ni$^{2+}$)/m(Mn$^{4+}$)) satisfy specific conditions. The lithium transition metal oxide has a uniform and stable layered structure through control of the oxidation number of transition metals, thus exerting superior rate characteristics under high-rate charge/discharge conditions as well as improved overall electrochemical properties.

BACKGROUND ART

Technological development and increased demand for mobile equipment have led to a rapid increase in the demand for secondary batteries as energy sources. Among these secondary batteries, lithium secondary batteries having high energy density and voltage, long cycle span and low self-discharge are commercially available and widely used.

In addition, increased interest in environmental issues has brought about a great deal of research associated with electric vehicles, hybrid electric vehicles and plug-in hybrid electric vehicles as substitutes for vehicles using fossil fuels such as gasoline vehicles and diesel vehicles. These electric vehicles generally use nickel-metal hydride secondary batteries as power sources. However, a great deal of study associated with use of lithium secondary batteries with high energy density and discharge voltage is currently underway and some are commercially available.

Meanwhile, the lithium secondary batteries generally use lithium-containing cobalt composite oxide (LiCoO$_2$) as a cathode active material. Also, the use of lithium-manganese composite oxides such as LiMnO$_2$ having a layered crystal structure and LiMn$_2$O$_4$ having a spinel crystal structure and lithium nickel composite oxide (LiNiO$_2$) as the cathode active material has been considered.

Among these cathode active materials, LiCoO$_2$ is the most generally used owing to superior physical properties such as long lifespan and good charge/discharge characteristics, but has low structural stability and is costly due to natural resource limitations of cobalt used as a raw material, thus disadvantageously having limited price competiveness.

Lithium manganese oxides such as LiMnO$_2$ and LiMn$_2$O$_4$ have advantages of superior thermal stability and low costs, but have disadvantages of low capacity and bad low-temperature characteristics.

In addition, LiMnO$_2$-based cathode active materials are relatively cheap and exhibit battery characteristics of superior discharge capacity, but are disadvantageously difficult to synthesize and are unstable.

In order to solve the afore-mentioned problems, the present invention provides a low-cost highly functional cathode active material comprising lithium transition metal composite oxide wherein constituent elements satisfy requirements including a predetermined composition and oxidation number, as mentioned below.

In this regard, U.S. Pat. No. 6,964,828 discloses a lithium transition metal oxide having a structure of Li(M1$_{(1-x)}$-Mn$_x$)O$_2$ wherein M1 is a metal other than Cr, and each Ni has an oxidation number of +2, each Co has an oxidation number of +3, and each Mn has an oxidation number of +4, provided that M1 is Ni or Co.

In addition, Korean Patent Laid-open No. 2005-0047291 suggests a lithium transition metal oxide wherein Ni and Mn are present in equivalents amounts and have an oxidation number of +2 and +4, respectively.

As another example, Korean Patent No. 543,720 discloses a lithium transition metal oxide wherein Ni and Mn are present in substantially equivalent amounts, Ni has an oxidation number of 2.0 to 2.5 and Mn has an oxidation number of 3.5 to 4.0. This patent discloses that Ni and Mn should substantially have an oxidation number of +2 and +4, respectively, and that lithium batteries are deteriorated in properties, unless Ni and Mn have an oxidation number of +2 and +4, respectively, as apparent from Examples and Comparative Examples.

Also, Japanese Patent Application Publication No. 2001-0083610 discloses a lithium transition metal oxide which is represented by a structure of Li((Li(Ni$_{1/2}$Mn$_{1/2}$)$_{(1-x)}$)O$_2$ or Li((Li$_x$(Ni$_y$Mn$_y$Co$_p$)$_{(1-x)}$)O$_2$ and contains Ni and Mn in equivalent amounts. In accordance with the application, provided that Ni and Mn are present in identical amounts, Ni and Mn form Ni$^{2+}$ and Mn$^{4+}$, respectively, realizing structural stability and thus providing the desired layered structure.

Accordingly, in accordance with the related art as mentioned above, the average oxidation number of transition metals should be +3, which is mentioned in U.S. Pat. No. 7,314,682. In this patent, the inventors disclose lithium transition metal oxide represented by the structure of Li$_{(2+2x)/(2+x)}$M'$_{2x(2+x)/(2+x)}$M$_{(2-2x)/(2+x)}$O$_{2-\delta}$ wherein M' is an element having an average oxidation number of +3, in which M' is not a Li metal, and M is a transition metal having an average oxidation number of +3.

As can be confirmed from the afore-mentioned related patents, it was conventionally believed that (i) transition metals should have an average oxidation number of +3 in order to impart a stable layered structure to lithium transition metal oxide, and (ii) Ni present in an amount equivalent to Mn$^{4+}$ should have an oxidation number of +2 in order to impart superior electrochemical properties to the lithium transition metal oxide, based on premise (i).

However, the inventors of the present application confirmed that, in the case where Mn$^{4+}$ and Ni$^{2+}$ are simply selected to obtain an average oxidation number of +3, Ni$^{2+}$ or the like is transferred to reversible Li sites, the problem, deterioration in electrochemical properties, cannot be solved.

Meanwhile, U.S. Pat. Nos. 7,078,128 and 7,135,252 suggest materials wherein Mn is present in an amount higher than that of Ni. However, the inventors of the present invention confirmed based on test results that a high amount of Mn cannot change an oxidation number of Mn$^{4+}$ upon Li-charging, thus causing a decrease in capacity.

Meanwhile, it is generally known that the case, in which Co is present, maintains superior structural stability than the case in which Co is not present. However, as mentioned above, Co is more expensive than Ni, Mn or the like and attempts continue to be made to reduce use thereof. Unless the afore-mentioned specific conditions are satisfied, superior performance cannot be exerted, and although active materials satisfying the requirements are actually synthesized, they exhibit poor electrochemical properties such as decrease in capacity and deterioration in rate properties.

DISCLOSURE

Technical Problem

Therefore, the present invention has been made to solve the above problems and other technical problems that have yet to be resolved and it is one aspect of the present invention to provide a cathode active material with superior structural and electrochemical properties.

As a result of a variety of extensive and intensive studies and experiments to solve the problems as described above, the inventors of the present invention have discovered that in the case where a cathode active material is based on a lithium transition metal oxide having a layered crystal structure wherein the transition metal has an average oxidation number higher than +3, the content of nickel is higher than that of manganese, and the content of $Ni^{2+}$ is lower than that of $Mn^{4+}$, and the cathode active material has a complete crystal structure, thus considerably improving high-rate charge/discharge characteristics. The present invention was completed, based on this discovery.

Technical Solution

Accordingly, the cathode active material for lithium secondary batteries according to the present invention is a lithium transition metal oxide which has an $\alpha$-$NaFeO_2$ layered crystal structure, wherein the transition metal includes a blend of Ni and Mn, an average oxidation number of all transition metals except lithium is +3 or higher, and the lithium transition metal oxide satisfies Equations 1 and 2 below:

$$1.0 < m(Ni)/m(Mn) \quad (1)$$

$$m(Ni^{2+})/m(Mn^{4+}) < 1 \quad (2)$$

wherein m(Ni)/m(Mn) represents a molar ratio of nickel to manganese and m $(Ni^{2+})/m(Mn^{4+})$ represents a molar ratio of $Ni^{2+}$ to $Mn^{4+}$.

As mentioned above, it was conventionally known in the art that an average oxidation number of transition metal ions should be adjusted to +3 by adding $Ni^{2+}$ and $Mn^{4+}$ in equivalent amounts in order to obtain a desired layered structure. However, since $Ni^{2+}$ has a size substantially similar to $Li^+$, it moves to the lithium layer and readily forms mineral salts, thus disadvantageously causing deterioration in electrochemical properties.

Accordingly, the inventors of the present invention conducted a great deal of research to prepare a cathode active material which has a stable layered crystal structure and exhibits superior capacity and rate characteristics. As a result, the inventors discovered that the stability of the layered crystal structure depends on the size difference between the lithium ion and the transition metal ion, rather than $Ni^{2+}$ and $Mn^{4+}$.

Specifically, the inventors confirmed that lithium composite transition metal oxide having a layered crystal structure of $\alpha$-$NaFeO_2$ is divided into a lithium-containing Li-oxide layer (referred to as a "lithium layer") and a transition metal-containing transition metal oxide layer (referred to as an "MO layer"). As the size difference between the ions constituting respective layers, that is, the size difference between the lithium and transition metal ions, increases, the more easily can the two layers be separated and developed.

The inventors of the present invention continually tried to accomplish the desired layered crystal structure. As a result, the inventors confirmed that the size difference between the ions may be indicated by the bonding distance between each ion and the oxygen ion or bonding force therebetween, and as the oxidation number of a metal having cationic characteristics increases, ionic diameter decreases. Accordingly, the inventors considered that the difference between the MO layer and the lithium layer can be increased by increasing the oxidation number of transition metals. This expectation was confirmed through a great deal of experiments.

The principle that the layered crystal structure can be suitably developed through increased size difference between the lithium ion and the transition metal ion by increasing the average oxidation number of the transition metal to a level higher than +3 is in contrast to the conventional idea accepted in the art that the average oxidation number of transition metals should be adjusted to +3 to stabilize the layered crystal structure.

Meanwhile, the case where the contents of Ni and Mn are substantially equivalent in a conventional manner is undesirable in that $Mn^{4+}$ induces formation of $Ni^{2+}$ and, in compounds containing a great amount of Mn, a great amount of $Ni^{2+}$ is arranged in the lithium layer.

Accordingly, the inventors of the present invention predicted that the best method to increase the oxidation number of transition metals would be to adjust the total average oxidation number to +3 or higher by decreasing the amount of $Ni^{2+}$, which can be readily permeated into the lithium layer. It was considered that the amount of $Ni^{3+}$ having a size smaller than $Ni^{2+}$ increases, thus causing an increase in size difference between the ions.

Accordingly, the cathode active material according to the present invention, as mentioned above, contains nickel and manganese wherein nickel is present in an amount higher than manganese (see Equation (1)) and $Ni^{2+}$ is present in an amount smaller than $Mn^{4+}$ (see Equation (2)).

Accordingly, the cathode active material of the present invention is a lithium nickel manganese oxide wherein (i) an average oxidation number of nickel and manganese except lithium is greater than +3, (ii) wherein more nickel is present than manganese and (iii) less $Ni^{2+}$ is present than $Mn^{4+}$.

Advantageously, such lithium manganese oxide maintains the average oxidation number of transition metals to a level higher than +3, thus considerably decreasing the amount of transition metals present in the lithium layer, based on the stable crystal structure of the cathode active material, thereby improving mobility and rate characteristics of lithium ions, as well as capacity.

Regarding aspect (i), the cathode active material of the present invention has an average oxidation number of transition metals except lithium, higher than +3, thus decreasing an average size of transition metal ions, increasing the size difference between lithium ions, and promoting separation between layers, thereby forming a stable layered crystal structure.

Preferably, the average oxidation number of total transition metals except Li is higher than 3.0 and not higher than 3.5, more preferably, 3.01 to 3.3, more particularly preferably, 3.1 to 3.3.

Regarding aspect (ii), the cathode active material according to the present invention is composed of nickel and manganese wherein the content of nickel is higher than that of manganese, on a molar basis, as represented by Equation 1 below:

$$1.0 < m(Ni)/m(Mn) \quad (1)$$

In the case where nickel is present in an amount higher than manganese, nickel in an amount corresponding to the difference between the nickel content and the manganese content, is changed to $Ni^{3+}$, which has a relatively small ionic size.

Accordingly, the average size difference between the lithium ion and the transition metal ion increases, thus minimizing intercalation of $Ni^{2+}$ into the lithium layer and improving stability of the layered crystal structure.

On the other hand, when manganese is present in an amount higher than nickel, +4 ions which do not enhance charge/discharge characteristics are increased and capacity is thus decreased.

As mentioned above, in the case where the cathode active material according to the present invention contains excess nickel, as compared to manganese, the nickel is divided into nickel (a) present in an excessive amount, as compared to the manganese content and nickel (b) present in an amount corresponding to the manganese content.

Preferably, the nickel (a) present in an excessive amount, as compared to the manganese content is $Ni^{3+}$, and the nickel (b) present in an amount corresponding to the manganese content contains $Ni^{2+}$ and $Ni^{3+}$.

Regarding aspect (iii), the cathode active material according to the present invention is composed of nickel and manganese wherein a molar ratio of $Ni^{2+}$ to $Mn^{4+}$ ($m(Ni^{2+})/m(Mn^{4+})$) is lower than 1 (that is, $Ni^{2+}$ and $Mn^{4+}$ are not present in equivalent amounts and $Ni^{2+}$ is present in an amount smaller than $Mn^{4+}$), as represented by Equation 2 below:

$$m(Ni^{2+})/m(Mn^{4+}) < 1 \quad (2)$$

When the molar ratio of $Ni^{2+}$ to $Mn^{4+}$ is lower than 1 (that is, the content of $Ni^{2+}$ is equivalent to or higher than that of $Mn^{4+}$), the average oxidation number of transition metals does not increase and cannot induce the difference in ion size. In the case where $m(Ni^{2+})/m(Mn^{4+})$ is higher than 0.4 and lower than 0.9, considerably superior electrochemical properties can be obtained.

As such, for the cathode active material according to the present invention, the nickel content is equivalent to or higher than the manganese content and an average oxidation number of transition metals is higher than +3, thus increasing the size difference between the lithium ion and the transition metal ion, promoting layer separation and minimizing permeation of $Ni^{2+}$ into the lithium layer. For the cathode active material, the content of nickel intercalated into the lithium site may be lower than 5 mol %.

For the lithium transition metal oxide of the present invention, transition metals comprising nickel, manganese and optionally cobalt can be partially substituted with other metal element (s) within an amount, so long as the layered crystal structure can be maintained, preferably an amount not higher than 20% with a metal element (including transition metal) or a cationic element, more preferably an amount not higher than 10% with a metal element (including transition metal) or a cationic element, based on the mole of the transition metal. It is apparent that this case is included within the scope of the present invention so long as the properties of the present invention are satisfied.

The present invention provides a positive electrode comprising the cathode active material and a lithium secondary battery comprising the positive electrode. Hereinafter, the positive electrode is simply referred to as a "cathode".

The lithium secondary battery generally comprises a cathode, an anode, a separator, and a lithium salt-containing non-aqueous electrolyte.

For example, the cathode is prepared by applying a cathode mix comprising a cathode active material, a conductive material, a binder and a filler to a cathode current collector, followed by drying. The cathode mix may comprise a filler, if necessary.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium, silver or the like. If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

The conductive material is commonly added in an amount of 1 to 40% by weight, based on the total weight of the mixture including the cathode active material. Any conductive material may be used without particular limitation so long as it has suitable conductivity without causing adverse chemical changes in the fabricated secondary battery. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which enhances binding of an active material to a conductive material and current collector. The binder is commonly added in an amount of 1 to 40% by weight, based on the total weight of the compound including the anode active material. Examples of the binder include polyfluorovinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluoro rubbers and various copolymers.

The filler is a component optionally used to inhibit expansion of the cathode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

The anode is prepared by applying an anode active material to an anode current collector, followed by drying. The anode active material may further comprise the afore-mentioned ingredients.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, these current collectors may also be processed to form fine irregularities on the surface thereof so as to enhance adhesion to the anode active materials. In addition, the current collectors may be used in various forms including films, sheets, foils, nets, porous structures, foams and non-woven fabrics.

In addition, examples of anode active materials that can be used in the present invention include carbons such as hard carbons and graphite carbons; metal composite oxides such as $Li_yFe_2O_3$ ($0 \leq y \leq 1$), $Li_yWO_2$ ($0 \leq y \leq 1$), $Sn_xMe_{1-x}Me'_yO_z$ (Me: Mn, Fe, Pb, Ge; Me': Al, B, P, Si, Group I, II and III elements of the Periodic Table, halogens; $0 < x \leq 1$; $1 \leq y \leq 3$; $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like; conductive polymers such as polyacetylene; and Li—Co—Ni materials.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

Advantageous Effects

As apparent from the fore-going, the present invention provides a cathode active material which is based on lithium transition metal oxide having a layered crystal structure, wherein an average oxidation number of transition metals except lithium is higher than +3, and $Ni^{3+}$ among nickel corresponding to the manganese content is present in a relatively higher amount, thus realizing a uniform and stable crystal structure, and exhibiting superior overall electrochemical properties including battery capacity and considerably superior high-rate charge/discharge characteristics.

BEST MODE

Now, the present invention will be described in more detail with reference to the following Examples. These examples are provided only for illustrating the present invention and should not be construed as limiting the scope and spirit of the present invention.

EXAMPLE 1

Transition metal salts were dissolved in distilled water such that a molar ratio of nickel salt and manganese salt (Ni/Mn) was adjusted to 1.12 and a molar ratio of a cobalt salt to the all transition metal salts was adjusted to 9 mol %. Then, a transition metal composite was obtained, while elevating the basicity of the aqueous transition metal solution. The solvent was removed from the transition metal composite via vacuum filtration and dried in an oven at 110☐ for 18 hours to remove remaining solvent. The resulting composite had a structure of $M(OH_{1-x})_2$ (in which M represents all transition metals and x has a value of about 0.55 in accordance with thermogravimetric analysis). The lithium salt was mixed such that the molar ratio of $Ni^{2+}/Mn^{4+}$ was adjusted to 0.88, heated in an electric furnace at an elevating rate of 300° C./hour up to about 960° C. and sintered at this temperature for 10 hours to obtain a lithium transition metal composite oxide.

EXAMPLE 2

Lithium transition metal composite oxide was obtained in the same manner as in Example 1 except that the lithium salt was mixed such that the molar ratio of $Ni^{2+}/Mn^{4+}$ was 0.75.

COMPARATIVE EXAMPLE 1

Lithium transition metal composite oxide was obtained in the same manner as in Example 1 except that the lithium salt was mixed such that the molar ratio of $Ni^{2+}/Mn^{4+}$ was 1.

EXAMPLE 3

Lithium transition metal composite oxide was obtained in the same manner as in Example 1 except that the lithium salt was mixed such that the molar ratio of nickel salt to manganese salt (Ni/Mn) was 1.06 and the molar ratio of $Ni^{2+}/Mn^{4+}$ was 0.88.

EXAMPLE 4

Lithium transition metal composite oxide was obtained in the same manner as in Example 3 except that the lithium salt was mixed such that the molar ratio of $Ni^{2+}/Mn^{4+}$ was 0.76.

COMPARATIVE EXAMPLE 2

Lithium transition metal composite oxide was obtained in the same manner as in Example 3 except that the lithium salt was mixed such that the molar ratio of $Ni^{2+}/Mn^{4+}$ was 1.

EXPERIMENTAL EXAMPLE 1

The cathode active materials prepared in Examples 1 to 4 and Comparative Examples 1 and 2 were thoroughly mixed with NMP such that a weight ratio (wt %) of an active material:a conductive material:a binder was 95:2.5:2.5. The mixture thus obtained was applied to a 20 μm Al foil and dried at 130□ to obtain a cathode. The cathode thus obtained was roll-pressed to have a porosity of about 25% and punched in the form of a coin with an area of 1.487 cm². Li-metal was used as the counter electrode of the punched cathode and a coin-shaped battery was obtained using an electrolyte solution of 1M LiPF6 in a solvent of EC:DMC:DEC=1:2:1.

The first cycle discharge capacity and efficiency of the battery were obtained through 0.1 C charge/0.1 C discharge, a ratio of 1 C or 2 C discharge capacity to 0.1 C charge was calculated as a percentage, rate capability was measured and the results thus obtained are shown in Table 1 below:

EXPERIMENTAL EXAMPLE 2

The cathode active materials prepared in Examples 1 to 4 and Comparative Examples 1 and 2 were subjected to XRD, the structure thereof was analyzed through Retveld-refinement, a ratio of Ni ($Ni^{2+}$) present in the Li site was obtained and the results thus obtained are shown in Table 1 below.

TABLE 1

| | 1st cycle discharge capacity (mAh/g) | 1st cycle efficiency (%) | 1C discharge/ 0.1C discharge (%) | 2C discharge/ 0.1C discharge (%) | Average oxidation number of transition metals | Ratio of Ni ($Ni^{2+}$) intercalated into Li site (%) |
|---|---|---|---|---|---|---|
| Ex. 1 | 153.5 | 89.6 | 90.6 | 86.1 | 3.05 | 3.52 |
| Ex. 2 | 148.3 | 90.5 | 91.8 | 87.4 | 3.10 | 2.83 |
| Ex. 3 | 151.1 | 89.1 | 90.4 | 85.8 | 3.05 | 3.44 |
| Ex. 4 | 145.6 | 91.2 | 91.3 | 87.2 | 3.10 | 2.72 |
| Comp. Ex. 1 | 138.3 | 84.5 | 76.2 | 68.7 | 3.00 | 5.84 |
| Comp. Ex. 2 | 136.8 | 82.6 | 73.6 | 64.2 | 3.00 | 6.13 |

As can be seen from Table 1 above, all lithium secondary batteries based on the cathode active materials according to the present invention exhibited a 1st discharge capacity of 145. 6 mAh/g and a 1st charge efficiency of at least 89.1%. In addition, all lithium secondary batteries based on the cathode active materials according to the present invention exhibited a 2 C discharge capacity/0.1 C discharge capacity of at least 85.8%.

The ratio of Ni ($Ni^{2+}$) intercalated into Li site (%) in Table 1 means the ratio of Ni ($Ni^{2+}$) which shares in the total Li site, i.e., sharing ratio. The cathode active materials according to the present invention had an average oxidation number of the transition metals higher than +3 and a ratio of Ni ($Ni^{2+}$) intercalated into Li site (%) of 3.52 or less.

These results demonstrate that the cathode active material of the present invention increases the oxidation number of the transition metal layer, thereby increasing the size difference between the lithium ion and the transition metal ion and thus improving structural stability and electrochemical properties.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium transition metal oxide having an α-NaFeO₂ layered crystal structure, as a cathode active material for lithium secondary battery, wherein the transition metal includes a blend of Ni and Mn, an average oxidation number of the transition metals except lithium is +3 or higher, and the lithium transition metal oxide satisfies Equations 1 and 2 below:

$$1.0 < m(Ni)/m(Mn) \tag{1}$$

$$m(Ni^{2+})/m(Mn^{4+}) < 1 \tag{2}$$

wherein m(Ni)/m(Mn) represents a molar ratio of nickel to manganese and m ($Ni^{2+}$)/m ($Mn^{4+}$) represents a molar ratio of $Ni^{2+}$ to $Mn^{4+}$.

2. The cathode active material according to claim 1, wherein the average oxidation number of transition metals is higher than 3.0 and not higher than 3.5.

3. The cathode active material according to claim 2, wherein the average oxidation number of the transition metals except lithium is 3.01 to 3.3.

4. The cathode active material according to claim 2, wherein the average oxidation number of the transition metals except lithium is 3.1 to 3.3.

5. The cathode active material according to claim 1, wherein the nickel is composed of nickel (a) present in an excessive amount, as compared to the manganese content and nickel (b) present in an amount corresponding to the manganese content.

6. The cathode active material according to claim 5, wherein the nickel (b) present in an amount corresponding to the manganese content contains $Ni^{2+}$ and $Ni^{3+}$.

7. The cathode active material according to claim 5, wherein the nickel (a) is present in an excessive amount as compared to the manganese content is $Ni^{3+}$.

8. The cathode active material according to claim 1, wherein the content of nickel intercalated into the lithium site is lower than 5 mol %.

9. A cathode comprising the cathode active material according to claim 1.

10. A lithium secondary battery comprising the cathode according to claim 9.

* * * * *